(12) United States Patent
Dworatzek

(10) Patent No.: US 6,579,448 B2
(45) Date of Patent: Jun. 17, 2003

(54) LIQUID FILTER WITH A BYPASS VALVE

(75) Inventor: Klemens Dworatzek, Edingen (DE)

(73) Assignee: Filterwerk Mann & Hummel GmbH, Ludwigsburg (DE)

( * ) Notice: Subject to any disclaimer, the term of this patent is extended or adjusted under 35 U.S.C. 154(b) by 0 days.

(21) Appl. No.: 09/801,834

(22) Filed: Mar. 9, 2001

(65) Prior Publication Data

US 2001/0035376 A1 Nov. 1, 2001

(30) Foreign Application Priority Data

Mar. 9, 2000 (DE) .................................. 200 04 431 U

(51) Int. Cl.[7] .............................................. B01D 27/10
(52) U.S. Cl. ....................... 210/130; 210/430; 210/440; 210/457; 210/DIG. 17
(58) Field of Search ................................. 210/130, 133, 210/429, 430, 440, 443, 444, 457, DIG. 17

(56) References Cited

U.S. PATENT DOCUMENTS

| 3,589,517 A | * | 6/1971 | Palmai ........................ 210/130 |
| 3,633,750 A | * | 1/1972 | Braun et al. ................. 210/130 |
| 3,807,561 A | * | 4/1974 | Cullis ......................... 210/130 |
| 4,497,706 A | * | 2/1985 | Pickett et al. ................ 210/130 |
| 5,770,054 A | * | 6/1998 | Ardes .......................... 210/130 |

FOREIGN PATENT DOCUMENTS

| DE | 19605425 | | 6/1998 | |
| FR | 2465507 | * | 4/1981 | ................. 210/130 |

* cited by examiner

*Primary Examiner*—Matthew O. Savage
(74) *Attorney, Agent, or Firm*—Crowell & Moring LLP

(57) ABSTRACT

A liquid filter, especially for oil of an internal combustion engine, with a bypass valve including a valve body 20 and a valve seat 21 integrated in an end plate 32 of the filter insert. A spring 22, which urges the bypass valve closed, is mounted in a support member 24 attached to the housing. Thus, parts of the bypass valve subject to wear and soiling can be replaced each time filter element 18 is replaced, and reliable operation of the bypass valve is assured throughout the life of the filter. The filter insert can be designed free of metal for easy disposability. The filter cartridge can also be used with known filter arrangements in which a permanent valve body is housed in the support member 24. When the filter element of the invention is used, this permanent valve body stays in the support member and functions as an intermediate piece 35, which transmits force between spring 22 and valve body 20. The valve function is assumed by new valve body 20 engaging valve seat 21.

13 Claims, 2 Drawing Sheets

US 6,579,448 B2

LIQUID FILTER WITH A BYPASS VALVE

BACKGROUND OF THE INVENTION

The invention relates to a liquid filter, especially an oil filter for an internal combustion engine, with a bypass valve for the liquid to be filtered in which the bypass valve and a valve seat are mounted in the area of the end plate of the filter insert. In addition, the invention relates to a filter insert that is suitable for installation in a liquid filter of this type.

In liquid filters with cylindrical filter inserts, it is known to house a bypass valve in the area of one of the axial end plates. This is to assure that liquid will still flow in case the throughput resistance at the filter element increases to an unacceptably high level. In such a case, the liquid supply is ensured for the liquid system by opening the bypass valve.

A liquid filter with a bypass valve is disclosed, for example, in German Patent No. DE 196 05 425 C2. FIG. 2 of this patent shows a liquid filter in disassembled condition. A support member 15 is provided in the housing on which a valve body 9 that is biased by a spring 12 is mounted. When the filter element 3 is installed in the filter, a valve seat 14 is found in the end plate 5 associated with the filter element. This provides a cost-effective structure for the bypass valve.

However, when the filter element is changed, only the valve seat 14 included in filter element 3 is changed. Valve body 9 remains in the support member, which is designed so that it is fixed to the housing. Therefore, in the course of filter use, the valve body 9 is exposed to wear and soiling. Consequently, the valve body can lose its seal integrity, especially in modern diesel engines, because of the deposit of soot particles, so an undesirable, unfiltered secondary current of lubricating oil develops at the bypass valve. Because of this, the quality of the lubricating oil is impaired, which either endangers the function of the internal combustion engine or means that more frequent oil change intervals are necessary.

In order to prevent a malfunction, valve body 9 can also be changed at each filter change. However, this creates increased installation effort and produces a source of possible defects because a technician could forget to replace the valve body.

SUMMARY OF THE INVENTION

It is therefore the object of the invention to provide a liquid filter with a simply structured bypass valve.

It is also an object of the invention to provide a liquid filter with a bypass valve which is reliable in function over the entire service life of the filter.

These and other objects are achieved in accordance with the present invention by providing a liquid filter having a housing structure with an inlet and an outlet for the liquid to be filtered, in which a cylindrical filter insert is installed, which has a bypass valve in the area of one of the end plates, and in which the bypass valve comprises a valve body which is movably mounted in the filter insert and which in a closed state contacts a valve seat integrated in an end plate of the filter insert; and a support member is mounted on the housing for supporting a spring that is compressed against the installed valve body to urge the valve body against the valve seat.

The liquid filter according to the invention has a housing structure in which a filter insert is installed in a known manner. The housing structure can represent a separate housing or an integrated component e.g. of an internal combustion engine. The filter insert is designed so that it is cylindrical, while the bypass valve is housed in the area of one of the end plates of the filter insert. In this process, the valve seat is housed in a known way in the end plate. On the other side, in the housing structure a support member is provided that is used to install a spring that is responsible for pre-stressing or biasing the bypass valve whereby the opening pressure is defined.

The liquid filter is characterized in that the valve body is also mounted in the filter insert so that it can move and in such a way that during replacement of the filter element it can also be replaced. This means that an unacceptably high degree of soiling of the valve body, e.g. by soot deposits, is prevented since it is regularly changed along with the filter insert. The required high reliability of the liquid filter is thus attained.

The spring, which is preferably a coil spring of metal, remains in the support member when the filter element is changed. Because of this, the filter element can be designed so that it is free of metals, which makes is possible to dispose of the used filter element without difficulty, for example by incinerating the filter element.

In accordance with one advantageous embodiment of the invention, the valve body can move axially in the end plate of the filter insert. An axial stop for the valve body is provided in the opening direction of the bypass valve which limits the movement of the valve body away from the valve seat and assures that the valve body does not fall out when the filter insert is replaced. Alternatively, the valve body can be slightly oversized in relationship to its installation opening in the end plate so that it is prevented from slipping out during installation, but the axial movement capability for the valve function is still assured.

The axial stop for the valve body can advantageously be formed by resilient or elastic tabs. This makes the installation of the valve body in the end plate easier. During the installation, the resilient tabs move back and then prevent the valve body from falling out.

In accordance with another embodiment of the invention, the valve body can be manufactured at least partially of an elastomer. In this way, the sealing effect of the valve body on the valve seat, which is formed on the end plate, can be improved. For example, the valve body can be manufactured in a two-component injection molding technique in which an elastomer layer is formed on a surface of the valve body which engages the valve seat. Alternatively, the entire valve body can be manufactured of an elastomeric material.

In accordance with yet another advantageous embodiment of the invention, an intermediate piece can be mounted between the spring and the valve body which causes a transmission of force between spring and valve body when the filter insert is installed in the filter housing. The intermediate piece is especially advantageous if the entire valve body is manufactured of an elastomer. Because of the intermediate piece, the spring force can then be transferred to the valve body without damaging it. In addition, the intermediate piece can be used to secure the spring at its installation location.

The arrangement described above with intermediate piece can also be implemented with a liquid filter according to DE 196 05 425 C2. In order to prevent multiple use of the valve body when the filter insert is replaced, its function can be changed to that of the described intermediate piece by providing a suitably designed new valve body in the end plate of the replaceable filter insert. Thus, the former valve body takes on the function of force transmission between spring and valve body. The sealing function is transferred to the new valve body in the filter insert, which neither becomes soiled or worn and thus ensures reliable function of the bypass valve during further use of the liquid filter.

It is advantageous to simultaneously use the support member that serves for holding the spring as a support for the filter medium. This can be implemented if the filter element has flow that passes radially from the outside to the inside. Alternatively, the filter element can also have flow that passes from the inside to the outside. However, the support member must then be mounted outside the filter insert consistent with the required direction of action of the bypass valve, so the spring can develop its spring force from outside in the direction of the end plate of the filter element.

One advantageous design of the invention provides that, with a filter insert that has a radial flow from the outside to the inside, a passage in the filter insert which leads to the outlet of the housing structure and the bypass valve are arranged parallel to each other in one and the same end plate of the filter insert. In the case where the bypass valve is opened, the shortest distances can be realized in this manner, which prevents a soiling of the clean side of the filter element. In addition, a more compact structure of the liquid filter is possible because of this. In the structure described, it is advantageous to design the valve bodies with an annular or ring shape. The passage for the liquid filter outlet is then mounted on the inside and is surrounded annularly by the valve seat.

The housing structure of the liquid filter can advantageously be designed as a replacement for a disposable filter. This means that the filter insert in this housing structure can be replaced individually, but the entire housing structure can be mounted at the installation location instead of a disposable filter. In this way, for example, the disposable filters of older engine model series can be replaced by more environmentally friendly variations comprising reusable housings with replaceable filter inserts.

These and other features of preferred embodiments of the invention, in addition to being set forth in the claims, are also disclosed in the specification and/or the drawings, and the individual features each may be implemented in embodiments of the invention either individually or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawings in which.

DETAILED DESCRIPTION OF PREFERRED EMBODIMENTS

Figure 1:
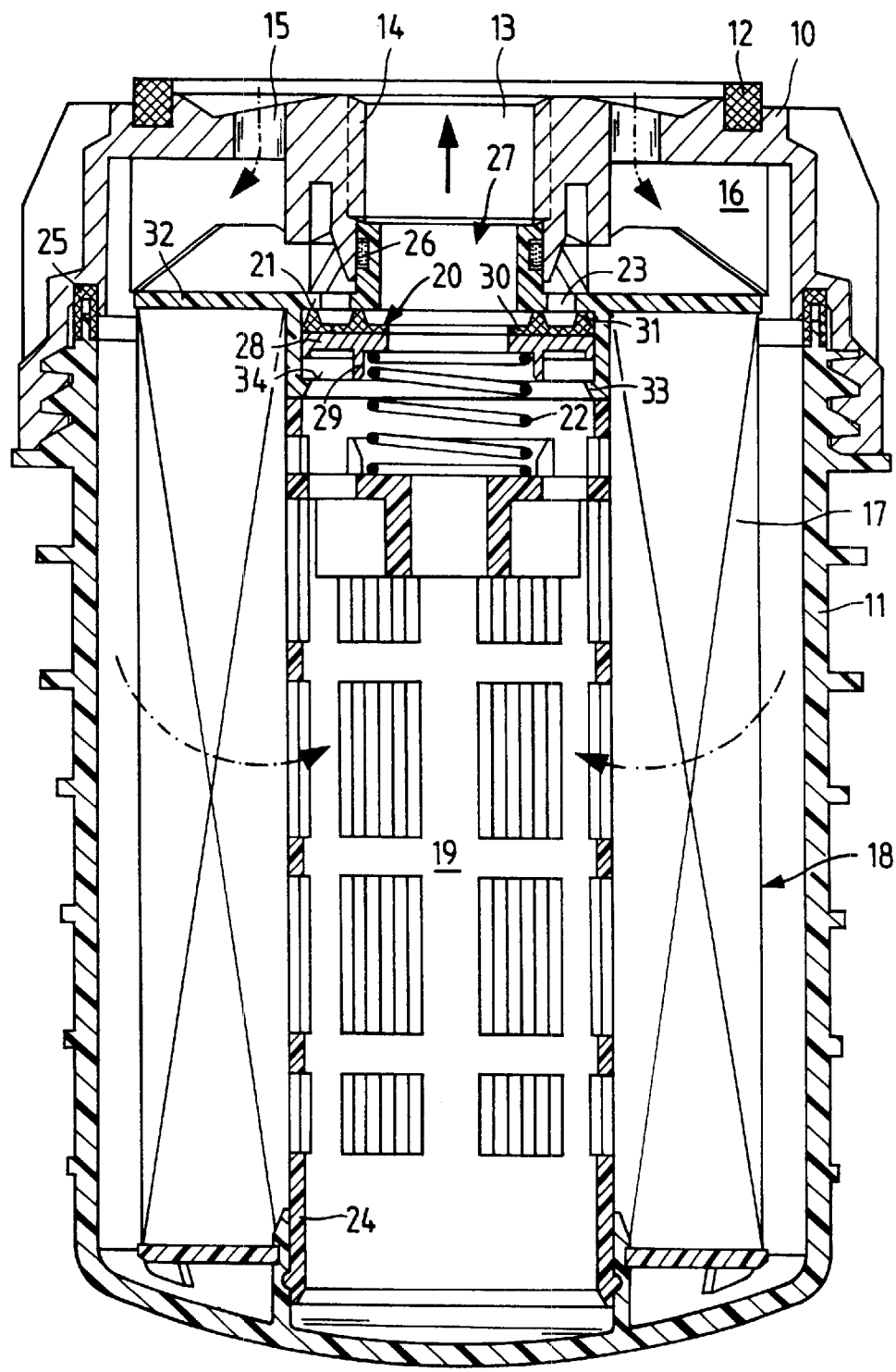
FIG. 1 shows a central cross sectional view of a liquid filter according to the invention designed as a replacement filter.

FIG. 1 shows a liquid filter having a housing structure comprising a base 10 and a threaded cover 11. With the help of a sealing ring 12 and a thread 14 in the base provided in an outlet 13, the housing structure is mounted at the installation location whereby an inlet 15 and the outlet are formed.

The liquid to be filtered flows through the inlet 15 in the raw side 16 of the filter, passes from there through a filter medium 17 of filter insert 18, thereby arriving at an inner chamber 19 of the filter insert that represents the clean side of the filter and flows out of the filter through the outlet 13. If a specific pressure difference at the filter element is exceeded, a bypass valve opens comprised of a valve body 20, a valve seat 21 and a spring 22 that presses the valve body against the valve seat. Because of this, the liquid flows through bypass openings 23 and thus goes in a direct path from the raw side 16 into chamber 19 of filter insert 18.

A support member 24 is mounted fixed in the threaded cover in which on one side the spring 22 is mounted and which on the other side serves to support the filter medium 17. Before installation, the filter insert 18, in which valve body 20 and valve seat 21 are integrated, can be slid onto this support member. Then the threaded cover 11 is screwed into the base 10, whereby sealing occurs because of a molded gasket 25 between base and threaded cover and because of an O-ring 26 between a passage 27 for the cleaned liquid and the outlet 13.

Valve body 20 is comprised of a valve plate 28 with a receptacle 29 for the spring 22, and on which a sealing disk 30 of an elastomeric material is mounted. Sealing disk 30 has two annular sealing lips 31 that are in contact with a valve seat 21 integrated in one end plate 32. The bypass openings 23 are annularly arranged in the intermediate space between sealing lips 31. The valve body is mounted in end plate 32 with axial play and has an axial stop 34 formed by a resilient elastic tab 33. The resilient tab is mounted encircling the lower end of the end plate. The resilient tab 33 moves back to permit the valve body 20 to be installed in the end plate 32, but then prevents the valve body that is not yet stressed by spring 22 from falling out.

Figure 2:
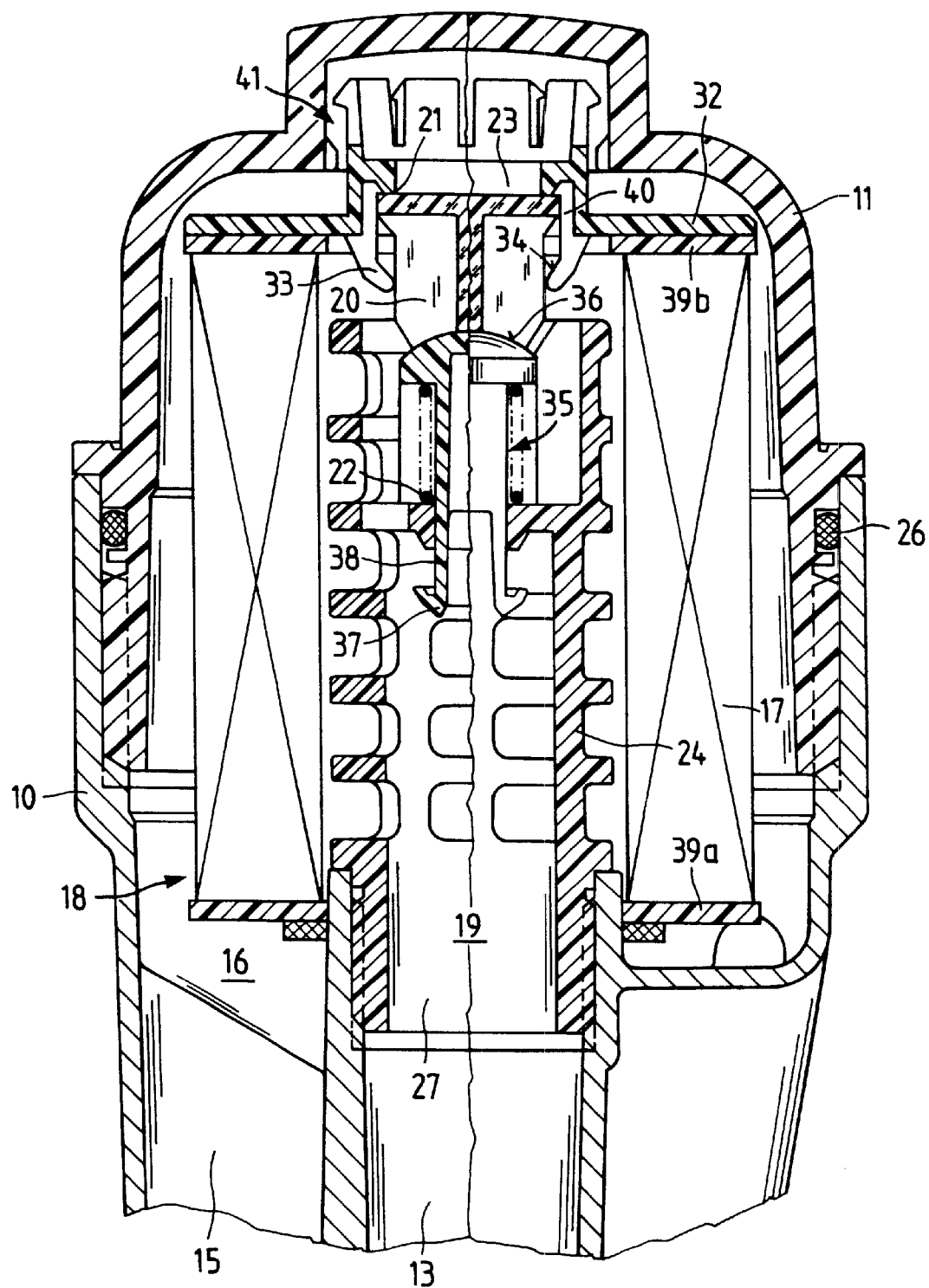
FIG. 2 shows a central cross sectional view of a liquid filter according to DE 196 05 425 C2 retrofitted with a filter insert according to the invention.

The liquid filter according to FIG. 2 basically follows the function principle already described for FIG. 1. Corresponding components are identified by the same reference numerals. The filter insert 18 also has radial flow from outside to inside. However, the passage 27 to the outlet 13 of the liquid filter is located opposite the bypass valve. In addition, an intermediate piece 35 is used in forming the bypass valve. This can also be effected with the use of a filter insert other than the one shown. In the solution shown, however, it is used only to hold spring 22 and to transmit the spring force to valve body 20, which is manufactured in one piece of an elastomeric material. The intermediate piece has a mushroom-shaped contact surface 36 that holds valve body 20. In addition, stop tabs 37 are provided that are mounted on resilient tongues 38. Because of these elements, the installation of the intermediate piece in support member 24 is easier and when the intermediate piece is installed, the spring 22 is fixed even when filter insert 18 is removed.

The filter medium is sealed on its axial end faces with film end plates 39a, b. The upper film end plate 39b is provided with end plate 32, which holds valve body 20 and contains valve seat 21. The valve body 20 is guided axially by ribs 40, which end in tabs 33 that act as an axial stop 34. In addition, end plate 32 provides a connecting latch mechanism 41 to secure filter insert 18 in the threaded cap 11 when the filter cap is unscrewed to open the filter.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. A liquid filter having a housing structure with an inlet and an outlet for a liquid to be filtered, in which a cylindrical filter insert with axial end plates is removably installed in said housing, and which has a bypass valve in an area of one of the end plates, wherein the bypass valve comprises a valve body which is movably mounted to the filter insert by one of said end plates and which in a closed state contacts a valve seat integrated in an end plate of the filter insert, wherein replacement of the filter insert replaces the valve body and valve seat, and a support member is mounted on the housing, said support member supporting a spring that is compressed against and removable from the valve body of the installed filter insert to urge the valve body against the valve seat.

2. A liquid filter according to claim 1, wherein the valve body is mounted so that it can move axially in the end plate of the cylindrical filter insert and wherein the bypass valve includes an axial stop which limits movement of the valve body away from the valve seat.

3. A liquid filter according to claim 2, wherein said axial stop is comprised of resilient tabs.

4. A liquid filter according to claim 1, wherein the valve body is comprised at least partially of an elastomer.

5. A liquid filter according to claim 1, wherein an intermediate piece is provided between the spring and the valve body to transmit force between the spring and valve body.

6. A liquid filter according to claim 1, wherein the support member is arranged in a cylindrical inner chamber of the filter insert such that a filter medium of the filter insert is supported on the support member.

7. A liquid filter according to claim 1, wherein the end plate with said valve seat is provided with a passage which connects to the outlet for the filtered liquid, and the bypass valve is mounted in said end plate parallel to said passage.

8. A liquid filter according to claim 7, wherein the valve body and the end plate with said valve seat surround said passage which connects to the outlet for the filtered liquid such that the bypass valve annularly surrounds said passage.

9. A liquid filter according to claim 1, wherein the housing structure is designed as a replacement filter.

10. A liquid filter according to claim 1, wherein said filter is an oil filter for an internal combustion engine.

11. A cylindrical filter insert with axial end plates and a bypass valve in an area of one of the end plates, wherein the bypass valve comprises a valve body which is movably mounted to the filter insert by one of said end plates and which in a closed state contacts a valve seat integrated in said one end plate of the filter insert, and said filter insert being installed in a filter housing such that a spring mounted on the housing is compressed against the valve body to urge the valve body against the valve seat, wherein the valve body is mounted so that it can move axially in said one end plate and wherein the bypass valve includes an axial stop integrated in said one end plate which limits movement of the valve body away from the valve seat, wherein removal of the filter insert from the housing also removes the valve body valve seat, and axial stop from the housing while said spring remains mounted to said housing.

12. A filter insert according to claim 11, wherein said axial stop is comprised of resilient tabs.

13. A filter insert according to claim 11, wherein the valve body is comprised at least partially of an elastomer.

* * * * *